United States Patent [19]
Branham et al.

[11] Patent Number: 5,800,013
[45] Date of Patent: Sep. 1, 1998

[54] VEHICLE PASSENGER SEATING

[75] Inventors: John Frederick Branham, Aylesbury; John Tcheng, Gerrards Cross, both of England

[73] Assignees: Flight Equipment & Engineering Limited, Chesham; John F. Branham, Aylesbury, both of England

[21] Appl. No.: 162,362

[22] Filed: Nov. 5, 1993

Related U.S. Application Data

[63] Continuation of Ser. No. 366,529, Jun. 15, 1989, abandoned.

[51] Int. Cl.$^6$ .................................................. A47C 15/00
[52] U.S. Cl. ............... 297/232; 297/452.18; 297/411.44
[58] Field of Search .......................... 297/445, 232, 297/248, 440.1, 440.14, 440.22, 440.2, 445.1

[56] References Cited

U.S. PATENT DOCUMENTS

| | | | |
|---|---|---|---|
| 3,893,729 | 7/1975 | Sherman et al. | 297/232 X |
| 4,099,780 | 7/1978 | Schmidhuber | 297/232 X |
| 4,186,964 | 2/1980 | Marrujo et al. | |
| 4,229,040 | 10/1980 | Howell et al. | |
| 4,440,441 | 4/1984 | Marrujo et al. | 297/232 X |
| 4,489,978 | 12/1984 | Brennan | 297/232 |
| 4,603,903 | 8/1986 | Moscovitch | 297/240 X |

FOREIGN PATENT DOCUMENTS

| | | | |
|---|---|---|---|
| 2729565 | 12/1978 | Germany | 297/232 |
| 190079 | 8/1990 | Germany | 297/232 |

*Primary Examiner*—Jose V. Chen
*Attorney, Agent, or Firm*—Watson Cole Grindle Watson, P.L.L.C.

[57] ABSTRACT

A longitudinal member for a support frame for a vehicle multiple passenger seating unit, the support frame including two transverse, parallel horizontal beams joined by at least two spaced, generally horizontal longitudinal members, is formed in one piece with at least a major part of an armrest and provides bores through which the beams pass. When located at a side of the support frame adjacent an aisle, the longitudinal member defines a recess in a side thereof facing the aisle in which constructional elements of the support frame can be positioned, and a panel is snap fit within a groove in the longitudinal member to cover the recess and the constructional elements therein.

14 Claims, 2 Drawing Sheets

5,800,013

1

VEHICLE PASSENGER SEATING

CROSS-REFERENCE TO RELATED APPLICATION

This application is a continuation of application Ser. No. 366,529, filed Jun. 15, 1989, now abandoned.

FIELD OF THE INVENTION

Seating for passengers in vehicles is commonly provided on seating units comprising two or more seats abreast. The invention is concerned with the construction of such seating units.

THE PRIOR ART

Such a seating unit is usually constructed on a support frame comprising two transverse parallel beams, usually tubes of circular cross section, carried on legs having feet for engaging mountings on the floor of the vehicle. The transverse parallel beams are joined by two or more spaced generally horizontal longitudinal members. There is usually a longitudinal member at each side of a seating unit and at least one between each pair of adjacent seats. The transverse parallel beams enter or pass through bores in the longitudinal members, in which they are a close fit to provide a rigid structure. The bottom seat cushions are supported by the transverse parallel beams and/or the longitudinal members. The longitudinal members are extended rearwardly and upwardly from their bores through which the rearmost of the transverse parallel beams passes, to provide mountings, usually pivotal, for the backrests for the seats. One example of such a support frame is described in U.S. Pat. No. 4,229,040.

Side armrests are usually mounted on the longitudinal members at the sides of the support frame and intermediate armrests for defining and separating the seats are mounted on longitudinal members between adjacent seats or on parts of the frame adjacent to those longitudinal members.

The side armrest at a side of the seating unit which is to be adjacent to an aisle of a vehicle in which it is fitted must have sufficient strength to resist the leverage forces applied by passengers entering and leaving seats as well as impact forces which may be applied by passengers moving in the aisle or by trollies used to serve passengers occupying the seats. Such a side armrest is usually bolted to the flank of the side longitudinal member. The forces mentioned produce bending and shearing loads on the bolts and to resist these forces the bolts, the side armrest and the side longitudinal member must be of massive construction. To conceal the constructional details and give a neat appearance, it is usual to fit a shaped faring of reinforced plastics material over at least a part of the aisle side armrest and the longitudinal member on which it is mounted.

SUMMARY OF THE INVENTION

According to this invention, a longitudinal member for a support frame for a vehicle passenger seating unit is formed integrally with at least a major part of an armrest.

This arrangement simplifies the construction and assembly of a seating unit and enables increased strength to be provided without unduly massive construction.

The invention includes a support frame for a vehicle passenger seating unit which provides a plurality of seat locations abreast, the support frame comprising two transverse parallel beams joined by a plurality of spaced parallel longitudinal members substantially perpendicular to the beams, the longitudinal members having bores closely fitting the beams, wherein at least the longitudinal member at one side of the support frame is formed integrally with at least a major part of an armrest.

In a modification of the invention, the longitudinal members are located at least at each side of the support frame and between adjacent seat locations and each of the longitudinal members which are so located is formed integrally with at least a major part of an armrest.

In the case of a longitudinal member for the side of a support frame which is to be adjacent to an aisle when the support frame is mounted in a vehicle, the bores and the ends of the beams received in them and constructional details enabling it to be secured to other parts of the frame and for mounting other parts of the seat such as a backrest and a tray for a passenger in a seat behind would be exposed on its side which is to be outermost when it is in position in the support frame. According to a further feature of the invention, the side of such a longitudinal member which is to be outermost with respect to the seating unit is recessed with a wall surrounding and enclosing the bores and constructional details and a separate panel is provided to fit within the wall so as to conceal them.

The wall preferably has an undercut adjacent its inner edge and the panel is so dimensioned that it can be snapped into the undercut and will be self-retaining therein.

The recess may be utilised to accommodate other elements of the seating unit, such as mechanical control cables, electric cables and electrical components such as components of an audio system.

The invention includes a vehicle seating unit including at least one longitudinal member as described and a vehicle including such a seating unit.

The invention not only reduces the number of parts in the seating unit and thereby provides savings in assembly time and labour, but provides, in the case of a side armrest, a structure capable of withstanding the aforementioned forces with a significant saving of weight and width, measured in the lateral direction of the seating unit, so that increased space may be provided for passengers. As there is no bolting of armrest to longitudinal member, a neater appearance results and it is not necessary to use a shaped faring over the longitudinal member as hitherto.

BRIEF DESCRIPTION OF THE DRAWINGS

An embodiment of the invention is illustrated by the accompanying drawings, in which:

FIG. 3 is a section on the line 3—3 of FIG. 2.

DETAILED DESCRIPTION OF PREFERRED EMBODIMENT

Figure 1:
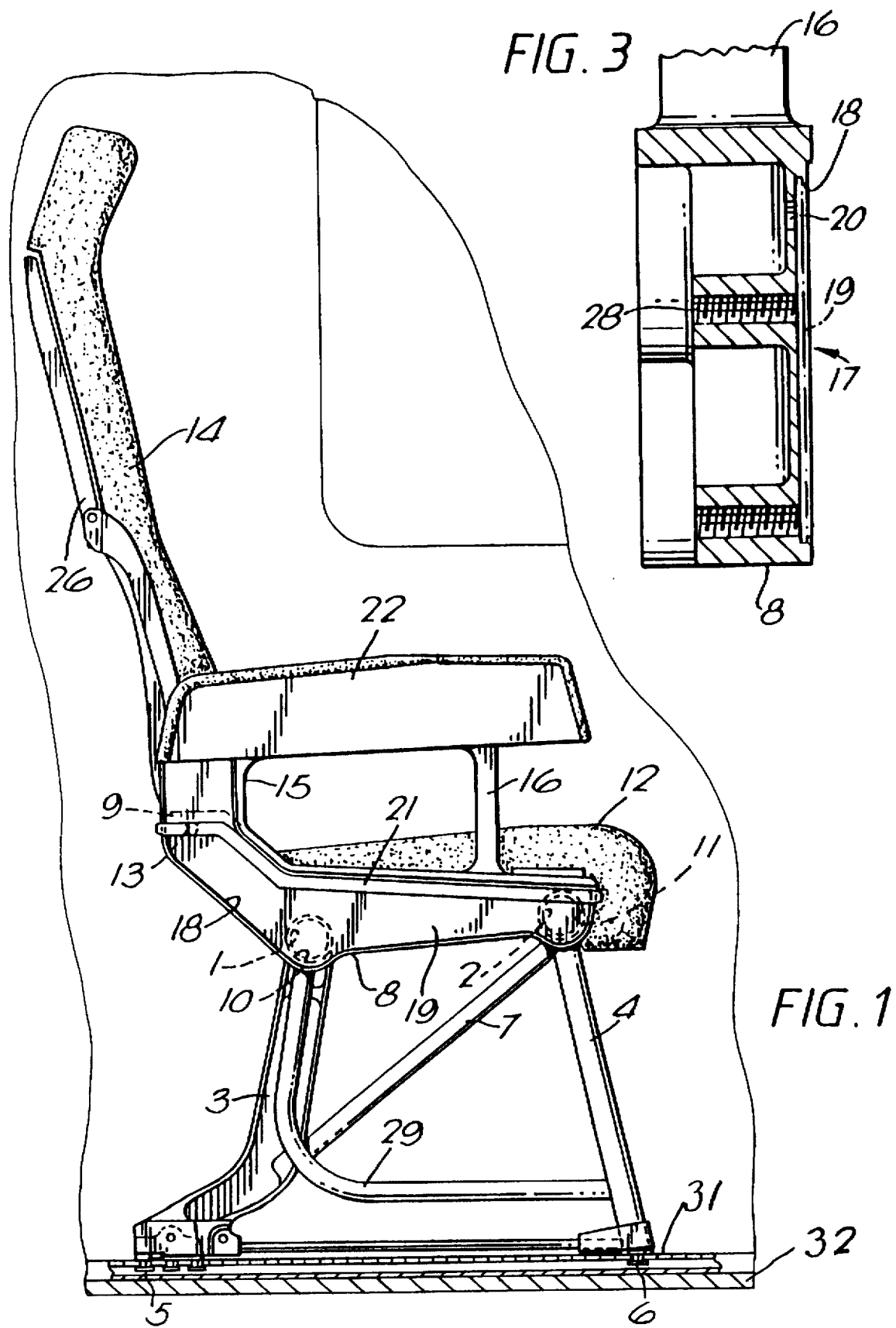
FIG. 1 is a side elevation of a vehicle seating unit, shown in relation to fragmental parts of a vehicle in which it is fitted, for example an aircraft.

The seating unit shown in FIG. 1 is constructed on a support frame comprising two tubular transverse parallel beams 1, 2, horizontal in the normal upright position of the seating unit. The beams are of circular cross section, carried on legs 3, 4 having feet 5, 6 respectively for engaging mounting strips 31 in the floor 32 of a vehicle and braced by a diagonal strut 7. The beams 1, 2 are joined by two or more spaced parallel longitudinal members, substantially perpendicular to the beams, also generally horizontal in the normal position of the seating unit. One of the longitudinal members, 8, is shown at the near side of the seating unit. The other longitudinal members are of a more conventional shape in this seating unit, but they could be similar to the member 8. For simplicity, only one other longitudinal member 9 is shown in the concealed detail. There is a longitudinal member at each side and between each pair of adjacent seats provided by the unit. The parallel beams 1, 2 are closely fitted in bores 10, 11 in an elongated portion 8a (see FIG. 2) of the longitudinal member 8 and similar bores in the other longitudinal members, thus providing a rigid structure and they are secured by clamping screws (not shown) in the longitudinal members. Bottom seat cushions 12 are supported by the parallel beams 1, 2. All the longitudinal members are extended rearwardly and upwardly from their bores 10, through which the rearmost parallel beam 1 passes, to provide pivotal mountings 13 for the backrests 14 for the seats. The side longitudinal member 8, however, is further extended upwardly by integral portion 8b and forwardly by a portion 8c to provide an integral armrest part 15, with an integral supporting strut 16. It can be seen in FIG. 2 that the portion 8c extends generally in parallel with the portion 8a.

Figure 2:
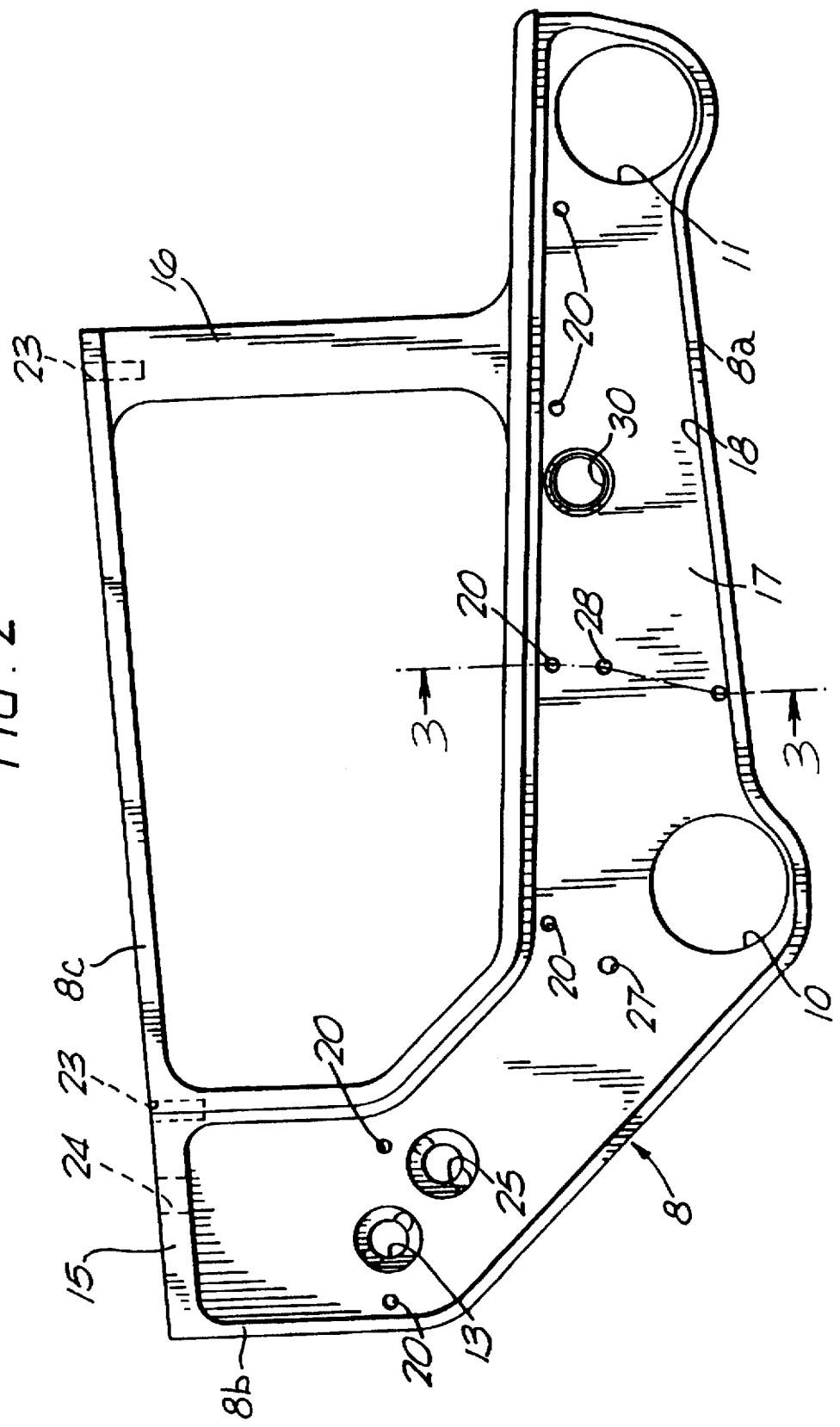
FIG. 2 is a side elevation of a side longitudinal member of the support frame of the seating unit shown in FIG. 1.

FIG. 2 shows the side of the member which will be outermost when it is mounted in the support frame. The open ends of the bores 10, 11 which are to receive the ends of the transverse beams 1, 2 and of the bore 13 in which the backrest 14 is to be mounted are visible on this side and in some previous seating constructions they would be covered by a shaped faring in the finished seat. Instead of this, the member 8 has a shallow recess 17 enclosing these constructional details, with an undercut peripheral lip 18. When the seating unit is assembled, a separate flat panel 19, shown in chain-dotted lines in FIG. 3, is fitted in this recess to conceal these constructional details, being of such dimensions that it may be snapped into place behind the lip 18 and will be self-retaining. This not only gives a neat appearance to the finished seat but is cheaper and more easily fitted than the usual shaped faring. It can also be replaced quite easily. Further advantages may be utilised by vehicle operators, for example to identify different rows of seats by fitting differently coloured panels 19; to give an individual appearance to a vehicle by fitting panels printed with the insignia of a charterer of the vehicle; or to advertise by fitting panels printed with advertising matter. The longitudinal member 8 itself may also be coloured, for example by anodising if it is of aluminium or an alloy or by self colouring if it is of a plastics/fibre composite material.

Six holes 20 are formed in the base of the recess 17 to receive fastenings for mounting a buffer bar 21, as shown in FIG. 1, and the panel 19 has aligned holes through which the fastenings can pass, so that impact forces applied by passengers or service trolleys are transmitted directly to the member 8.

An upholstered armrest top 22 is mounted on the armrest support 15, being secured in bores 23 in its top surface. A hole 24 provides for the passage of control cables, for example for the seat recline mechanism and for audio supply, into the armrest top 22. The member 8 also has the usual bores 25 for mounting a table 26, 27 for a seat belt anchorage, 28 for mounting the baggage bar 29, and 30 for anchoring the seat recline mechanism. In the finished seating unit, all these bores and elements fitted in them are concealed by the panel 19 as shown in FIG. 1.

Although in the preferred embodiment the longitudinal member 8 is formed integrally with only the major part 15, 16 of the armrest, its upper part could be shaped to provide the whole or substantially the whole of an armrest. In the latter case some padding would be mounted on its upper surface.

We claim:

1. A support frame for a vehicle passenger seating unit which provides a plurality of seat locations abreast, said support frame comprising two transverse parallel beams joined by a plurality of spaced parallel longitudinal members substantially perpendicular to said beans, said longitudinal members defining elongated first portions having bores in which said beams extend, and wherein at least the longitudinal member at one side of said support frame is a one-piece member that includes an integral second portion which extends away from said first portion and an integral third portion which is elongated and extends away from said second portion and generally in parallel with said first portion, said third portion providing at least a major part of an armrest.

2. A support frame for a vehicle passenger seating unit as claimed in claim 1 wherein said longitudinal members are located at least at each side of said support frame and between adjacent seat locations and each of said longitudinal members which are so located is a one-piece member formed integrally with at least a major part of an armrest.

3. A vehicle passenger seating unit which provides a plurality of seat locations abreast, said seating unit including a support frame as claimed in claim 2.

4. A vehicle including a passenger seating unit as claimed in claim 3.

5. A vehicle passenger seating unit which provides a plurality of seat locations abreast, said seating unit including a support frame as claimed in claim 1.

6. A vehicle including a passenger seating unit as claimed in claim 5.

7. A one-piece longitudinal member for use in a support frame for a vehicle passenger seating unit that includes a plurality of spaced, parallel beams, said longitudinal member defining an elongated first portion having a plurality of openings in which said plurality of beams can extend so as to connect said beams to said longitudinal member, an integral second portion which extends away from said first portion, and an integral third portion which is elongated and extends away from said second portion and generally in parallel with said first portion, said third portion constituting an integral armrest part.

8. A longitudinal member as claimed in claim 7, including an integral fourth portion which extends between said first portion and said third portion.

9. A longitudinal member as claimed in claim 7, wherein said third portion defines bores for mounting an armrest top.

10. A longitudinal member as claimed in claim 7 for a side of said seating unit which is to be adjacent to an aisle when said seating unit is fitted in a vehicle, the side of said longitudinal member which is to be outermost with respect to the seating unit being recessed with a wall surrounding and enclosing said bores, a separate panel being provided to fit within said wall.

11. A longitudinal member as claimed in claim 10, wherein said wall has an undercut adjacent its inner edge and said panel is so dimensioned that it can be snapped into said undercut and will be self-retaining therein.

12. A support frame for a vehicle passenger seating unit including at least one one-piece longitudinal member as claimed in claim 7.

13. A vehicle passenger seating unit including a support frame as claimed in claim 12.

14. A vehicle including a passenger seating unit as claimed in claim 13.

* * * * *